United States Patent [19]

Weaver et al.

[11] 4,194,016

[45] Mar. 18, 1980

[54] PROCESS FOR PREPARING PRECOOKED FRUITS AND VEGETABLES

[75] Inventors: Merle L. Weaver, Martinez; Keng C. Ng, Berkeley, both of Calif.

[73] Assignee: The United States of America as represented by the Secretary of Agriculture, Washington, D.C.

[21] Appl. No.: 941,340

[22] Filed: Sep. 11, 1978

Related U.S. Application Data

[63] Continuation-in-part of Ser. No. 809,355, Jun. 23, 1977, abandoned.

[51] Int. Cl.² .................. A23L 1/212; A23L 1/216
[52] U.S. Cl. .................. 426/419; 426/509; 426/510; 426/520; 426/524; 426/637
[58] Field of Search .............. 426/615, 637, 419, 444, 426/455, 456, 464, 472, 473, 482, 483, 509, 510, 517, 518, 523, 524, 506, 410, 412, 465, 520

[56] References Cited

U.S. PATENT DOCUMENTS

| | | | |
|---|---|---|---|
| 2,983,619 | 5/1961 | Shaw et al. | 426/637 X |
| 3,016,303 | 1/1962 | Cooley | 426/510 X |
| 3,063,849 | 11/1962 | Nelson et al. | 426/637 X |
| 3,410,702 | 11/1968 | Frank | 426/637 |
| 3,573,070 | 3/1971 | Smith et al. | 426/456 X |
| 3,644,129 | 2/1972 | Sloan | 426/509 X |
| 3,959,501 | 5/1976 | Shatila | 426/637 X |
| 3,973,047 | 8/1976 | Linaberry et al. | 426/456 X |

FOREIGN PATENT DOCUMENTS

| | | |
|---|---|---|
| 806128 | 2/1969 | Canada. |
| 1245471 | 9/1971 | United Kingdom ............ 426/412 |

OTHER PUBLICATIONS

Nelson et al. (I), "Retorting Foods in Plastic Bags," Food Engineering, 1-1956, pp. 92, 93, 140 & 143; 426-412.

*Primary Examiner*—Arthur L. Corbin
*Attorney, Agent, or Firm*—M. Howard Silverstein; David G. McConnell; Theodore J. Leitereg

[57] ABSTRACT

Precooked fruits or vegetables are prepared by a process wherein the fruits and vegetables are cooked to their centers at a temperature below the temperature at which sloughing of the surface tissue would occur if the fruits or vegetables were cooked to their centers at that temperature, i.e below about 81°–83° C. Following the cooking procedure the fruits or vegetables are heated in air and are then preserved.

12 Claims, No Drawings

PROCESS FOR PREPARING PRECOOKED FRUITS AND VEGETABLES

CROSS-REFERENCE TO RELATED APPLICATION

This is a continuation-in-part of our co-pending application, Ser. No. 809,355, filed June 23, 1977, now abandoned.

BACKGROUND OF THE INVENTION

1. Field of the Invention

This invention relates to and has among its objects the provision of novel prepared fruit and vegetable products and methods for making them. Further objects of the invention will be evident from the following description wherein parts and percentages are by weight unless otherwise specified.

2. Description of the Prior Art

Many vegetables are used in preparing ready-made soups, stews, etc., and fruits and vegetables are canned or pouched for distribution to the consumer. Generally, the fruits and vegetables must be precooked prior to canning or pouching them or, in the case of vegetables, incorporating them into ready-made soups, stews, and so forth. Generally, if fruits and vegetables are frozen, they become wet, soft, and mushy when thawed in preparation for consumption.

Potatoes, for example, especially those of high-solids content, fall apart or slough-off tissue when boiled or when retorted at high temperatures and pressures. Generally, low-solids potatoes are used for boiling or steaming. However, there is a limited supply of low-solids potatoes and they are available for only a short time every year.

A number of chemical additives such as calcium salts have been used to diminish the sloughing of fruit and vegetable tissue during the cooking process. However, these additives are not consistent in the effects produced. For example, chemical additives are more effective at certain stages of maturity and ineffective at others. Furthermore, these additives are effective only in certain varieties.

Another method for strengthening fruit and vegetable tissue involves precooking the fruit or vegetable at a temperature of 71° C. for a period of about 20 minutes, cooling the fruit or vegetable in water at 24° C. or lower, and finish cooking the fruit or vegetable at 100° C. for 30 to 50 minutes with either steam or water. The so-cooked fruit or vegetable still exhibits sloughing of tissue, has an excessive moisture content, and tends to be soft and mushy.

Fruits or vegetables that will not slough in boiling water or in steam can be prepared also by first partially dehydrating the fruit or vegetable to a moisture content of 40–50%. The partially dehydrated fruits or vegetables are frozen and can be finish-cooked when desired with minimum sloughing. The above-mentioned method has important disadvantages in that it is expensive in its overall operation and, in addition, requires an excessive amount of energy. These disadvantages greatly limit its commercial use.

Shaw et al in U.S. Pat. No. 2,983,619 (hereinafter referred to as '619), disclose a process for preparing potatoes which are non-sloughing for use in preserved food products. Potatoes are precooked for about 2 to 30 minutes at temperatures between 60°–100° C. but short of cooking to the state of edibility. Next, the potatoes are dried at 38°–121° C. such that no part of the individual potato solid has more than 68% water content, by weight, and no part of such solid has less than about 40% water, by weight. After drying, the potatoes are stored in an aqueous suspension of free starch or starchy flour to render them non-sloughing.

The process of Shaw is disadvantageous because it requires an excessive amount of energy to reduce the moisture content of the treated potatoes to a level of 40–68%. However, it was considered by those skilled in the art that such a moisture reduction was essential. Furthermore, the art-skilled person considered the presence of free starch to be necessary in preventing sloughing of a potato product prepared according to Shaw.

SUMMARY OF THE INVENTION

The invention described herein provides means for securing a prepared fruit or vegetable product that can be finish-cooked to yield a fruit or vegetable with excellent flavor, texture, and appearance. In the process of the invention raw fruits or vegetables are cooked to their centers at a temperature below the temperature at which sloughing of the surface tissue would occur if the fruits or vegetables were cooked to their centers at that temperature. Following the cooking procedure the fruits or vegetables are heated in air and then frozen or chilled to preserve them.

The primary advantage of the invention is that a precooked boiling vegetable product or precooked fruit product having excellent flavor, texture, and appearance after finish-boiling or finish-cooking is available. The finished product of the invention has the characteristics of a freshly-boiled vegetable or a freshly cooked fruit, but can be prepared in a much shorter time.

Another advantage is that the fruits or vegetables of the invention do not shatter during freezing, especially during blast freezing. Consequently, the loss of valuable material due to such shattering is avoided. In addition, the texture and appearance of the fruit or vegetable is maintained so that the finished product is appealing to the eye as well as the palate.

Another advantage of the invention is that additives are not necessary to improve texture; thus, the finished product is free of added agents some of which can affect the flavor of the product and the well-being of its consumers. Excellent products can be obtained in the absence of calcium salts or added starchy material such as aqueous starch suspensions.

There are certain advantages of the present invention, in addition to those mentioned above, which arise from its application to the preparation of precooked boiling potatoes.

First of all, the method of the invention can be applied with equal success to both high- and low-solids potatoes. Thus, high-solids potatoes which are abundantly available, can now be used by the industry to make a precooked boiling potato suitable for ready-made soups, stews, etc., or for canning, pouching, etc.

Secondly, potatoes prepared in accordance with the process of the invention may be fried, rather than boiled, prior to being consumed. This is an important advantage of the present process. In the first place, precooked frying potato products such as hash browns and pan-fried can be prepared from both high and low solids potatoes with the method disclosed herein whereas only high-solids potatoes can be used for making such products according to current technology.

Secondly, even though high-solids potatoes can be employed under the present state of the art to make precooked frying potatoes, such potatoes require an extended drying time of about 3 to 5 days at refrigeration temperatures in order to allow them to be thin-sliced or shredded. Potatoes prepared in accordance with the invention can be cut into thin pieces, i.e., shredded or thin-sliced, after chilling at a temperature of about 0.5° to 4.5° C. for only 1.5 to 4 hours. The shredded or thin-sliced potatoes are then frozen or chilled to reserve them. The so-prepared potatoes are fried in edible oil to make them ready for consumption. Fried potatoes that can be prepared in this manner include hash brown potatoes and pan-fried potatoes. It is important to note, however, that the potatoes of the invention cannot be used to prepare French-fried potatoes or shoe-string potatoes.

Another advantage of the invention is that the expense of energy required in other processes is minimized in our process. A monetary benefit as well as preservation of our valuable resources is realized.

DESCRIPTION OF THE PREFERRED EMBODIMENTS

The process of the invention will next be described in detail with emphasis on preparing a precooked boiling potato. This direction is by way of illustration and not limitation. In its broad ambit the process of the invention is applicable to the preparation of precooked fruits and vegetables of all kinds including carrots, beets, turnips, Jerusalem artichokes, sweet potatoes, apples, pears, and the like.

In the process of the invention raw, whole potatoes are peeled or not, as desired, and then cut into pieces or not, as desired. The potatoes are then subjected to a cooking step. The temperature and length of this cooking step are dependent upon the size of the potatoes to be treated. In this step the potatoes are cooked to their centers with either water or steam or combination of both at a temperature below the temperature at which sloughing of the surface tissue would occur if the potatoes were cooked to their centers at that temperature. Generally, this temperature is about 81°–83° C. and the potatoes are cooked at a temperature below 81°–83° C. for a period of approximately 5–45 minutes. The usual mode of cooking potatoes in water involves immersing the potatoes therein at the proper temperature. Alternatively, steam can be applied to the potatoes at the desired temperature, and at atmospheric or superatmospheric pressure.

It must be emphasized that the duration of cooking step is dependent upon the size, maturity, and type of potato used. Exact conditions for a particular lot of potatoes can be determined using pilot trials in accordance with the process and rationale of the invention.

The so-cooked potatoes are next heated (dried) in air, preferably at a temperature of about 66° to 93° C. for about 5 to 20 minutes. During this period the moisture content of the potatoes is generally reduced to a level such that no part of the potato tissue is lower than 68% moisture. The reduction in moisture content is dependent on the temperature and time of heating, the size, type, and nature of the potato, i.e., whether the potato is peeled or unpeeled, whole or cut into pieces. The heating step is critical to the method of the invention. By application of heat the retrogradation of starch is promoted. Further, the texture and flavor of the final product is enhanced. The removal of water from the surface tissue avoids cracking of the surface when the product of the invention is fast-frozen. However, although it appears that the reduction of moisture content is responsible for the improved texture, it may be that the important feature is solely the application of heat regardless of the extent of moisture removal. In any event, the heating step must be employed to obtain a good quality potato product.

Following the heating step the potatoes are treated to preserve them in the absence of starch suspensions. Usually, the so-prepared products are frozen and then packaged for retail sale or institutional use. The potatoes can be frozen in any conventional manner including refrigeration rooms, blast freezing, and the like. Alternatively, the prepared product can be chilled at about 0.5° to 4.5° C. or retorted in cans or plastic pouches to preserve them for future use.

It may be necessary in conjunction with the process of the invention to treat the cooked and heated-in-air potatoes to prevent after-cooking darkening. Any conventional technique may be used to this end. For example, the potatoes can be dipped in dilute aqueous solutions of citric acid, sodium acid pyrophosphate, sodium bisulfite, and the like.

To prepare them for consumption the products of the invention are simply cooked or boiled to the desired level of tenderness. It is a characteristic of the potatoes of the invention that they can be finish-cooked for extensive periods of time without sloughing or disintegrating in the absence of additives such as starchy suspensions. Our potatoes are desirable for stews and soups, which generally require long cooking periods in order to maximize their flavor. In general, a frozen product is cooked or boiled for a period of about 20 to 30 minutes at a temperature of about 90° to 100° C. whereas a chilled product is cooked or boiled for about 15 to 20 minutes at the same temperature. It should be remembered, however, that the finish-cooking time will vary with the potato. The final product has the appearance, flavor, and texture of a freshly-boiled product.

Alternatively, the products of the invention, after chilling for about 1.5 to 4 hours at a temperature of about 0.5° to 4.5° C., may be thin-sliced or shredded, frozen or chilled for preservation and then fried in oil, either on pans or grills or in a deep-fat fryer, at about 150° to 190° C. for about 5 to 20 minutes or until they are ready for consumption.

The product prepared in accordance with the procedure of the invention must be boiled or fried in order to consume it. If the so-prepared potatoes are baked, their interiors are wet and mushy, and the product is totally unacceptable as a consumable item. Thus, the present process is specific for preparing a boiling or frying potato product. Furthermore, it must be remembered that the potato of the invention can be used to prepare only thin-sliced fried potatoes, such as hash brown or pan-fried, and cannot be used to make French-fries or shoe-string potatoes.

EXAMPLES

The invention is further demonstrated by the following illustrative examples. Some of the experiments are not in accordance with the invention but are provided for purposes of comparison.

EXAMPLE 1

Raw potatoes (Russet Burbank, 21.5% solids content) were washed and peeled. The whole potatoes were then subjected to a cooking step using either water or steam, or a combination of both followed by a heating in air step, both at varying times and temperatures. The so-treated potatoes were examined and then frozen by blast-freezing. The frozen product was placed in boiling water in order to finish-cook it. The integrity of the so-cooked product was monitored during the finish-cooking procedure. The amount of time that passed until the product began to slough its surface tissue was recorded. The experiments and results are summarized in the following table.

77° C. for 30 minutes and then heated in air at 66° C. for 15 minutes.

Instead of freezing the so-treated potatoes, they were vacuum-sealed in plastic pouches and retorted for 30 minutes at 121° C. and a pressure of 1.02 atmospheres (15 psig) to preserve them.

The so-treated potatoes were finish-cooked in boiling water and did not begin to slough until after 45 minutes of cooking had lapsed. The potatoes of the invention had a very firm texture and good flavor. B. For a control the procedure of part A was followed except that

| | | Cook | | Heat | | Weight | Quality on finish-boiling | | |
|---|---|---|---|---|---|---|---|---|---|
| Run | Medium | Temp (°C.) | Time (min) | Temp (°C.) | Time (min) | loss (%) | Time (min) to sloughing | Flavor | Texture |
| 1 | Water | 77 | 30 | 66 | 30 | 12 | 60 | good | firm |
| 2 | Water | 71 | 30 | | | | | | |
| | Steam | 80 | 6 | 66 | 15 | 8.2 | 45 | very good | firm |
| 3 | Steam | 71 | 45 | 82 | 10 | 7.5 | 25 | excellent | firm |
| 4 | Steam | 71 | 45 | 66 | 15 | 8.5 | 60 | very good | firm |
| 5[a] | Water | 77 | 30 | none | | — | 15 | poor | wet and soggy |
| 6[a] | Water | 71 | 15 | | | | | | |
| | Steam | 100 | 6 | 93 | 10 | 9.5 | 6 | fair | wet and soggy |
| 7[a] | Water | 71 | 45 | | | | | | |
| | Steam | 100 | 15 | 93 | 10 | 10.0 | 10 | poor | cracking |
| 8[a] | Commercial product, whole, peeled, frozen | | | | | | 12[b] | very poor | falling apart |

[a]Not in accordance with the invention.
[b]This product totally disintegrated in 25 minutes.

EXAMPLE 2

A. Raw potatoes (Russet Burbank, 21.5% solids content) were washed, peeled, and cut (diced) into cubes of about 1 cm. The cubes were steamed for 30 minutes at 71° C. and heated in air for 5 minutes at 66° C. The so-treated cubes were frozen by blast-freezing.

In order to finish cook the above frozen product it was placed in boiling water. The so-prepared product did not slough for at least 45 minutes in the boiling water. The product of the invention had a firm texture and very good flavor—that of a freshly-cooked diced potato from a low-solids potato.

B. As a control the procedure carried out in part A was followed except that the step of heating the cubes in air was omitted.

On cooking the product of part B in boiling water, sloughing was observed in 15 minutes. The flavor of the so-cooked product was very bland and washed out and its texture was wet and soggy.

EXAMPLE 3

A. The general procedure followed in Example 1 was employed. The peeled tubers were treated with steam at the step of heating in air was omitted. The so-prepared potatoes disintegrated during the retorting step. Thus, the finish-cooking procedure was not performed.

EXAMPLE 4

Raw potatoes of the variety used in Example 1 were washed and peeled. The whole potatoes were then subjected to a cooking step using either water or steam. Then, the tubers were dipped for 1 minute in a 0.25% aqueous citric acid solution and then heated in air. The cooking step and the heating in air step were both carried out at varying times and temperatures. Following the heating step the potatoes were refrigerated at about 1.7° to 4.4° C. and 85 to 95% relative humidity for varying times to equilibrate them.

The so-treated potatoes were shredded using a commercial shredder and then the shredded potatoes were divided into two lots, one lot was frozen, the other refrigerated at 1.7° to 4.4° C. Each lot of potatoes was finish-fried on a commercial grill. The shredding ability of the so-produced potato as well as its texture, flavor, and color after finish-frying were noted. The results are summarized below.

| | | Cook | | Heat | | Weight | Equilibration | | | Quality on finish-frying | | |
|---|---|---|---|---|---|---|---|---|---|---|---|---|
| Run | Medium | Temp (°C.) | Time (min) | Temp (°C.) | Time (min) | loss (%) | Temp (°C.) | Time (hrs) | Shredding ability | Time (both sides) (min) | Flavor | Texture |
| 13 | Steam | 80 | 30 | 66 | 15 | 8.5 | 1.7 | 20 | very good | 8 | very good | mealy, firm |
| 14 | Water | 71 | 45 | 66 | 15 | 8.7 | 1.7 | 16 | very good | 8 | very good | mealy, firm |
| 15 | Water | 71 | 30 | 66 | 15 | 9.2 | 1.7 | 16 | very good | 8 | very good | mealy, firm |
| 16[a] | Water | 80 | 6 | | | | | | | | | |
| | Steam | 71 | 35 | 66 | 15 | 10.1 | 1.7 | 4 | very good | 8 | very good | mealy, firm |
| 17[b] | Water | 77 | 30 | — | — | — | 1.7 | 20 | could not be shredded, product was sticky and gummy | | | |
| 18[b] | Water | 77 | 30 | — | — | — | 4.5 | 96 | poor, product was sticky and gummy | 14 | poor | wet, soft |

-continued

| Run | Cook Medium | Cook Temp (°C.) | Cook Time (min) | Heat Temp (°C.) | Heat Time (min) | Weight loss (%) | Equilibration Temp (°C.) | Equilibration Time (hrs) | Shredding ability | Quality on finish-frying Time (both sides) (min) | Flavor | Texture |
|---|---|---|---|---|---|---|---|---|---|---|---|---|
| 19[b] | Commercial, frozen, shredded | — | — | — | — | — | — | — | — | 20 | poor | wet, soft |

[a] Peeled potatoes were cut into pieces of about 1.9 cm prior to application of cooking step.
[b] Not in accordance with the invention.

EXAMPLE 5

A. Raw apples (Pippen) were washed, peeled, and cut into 1 cm wedges. The apply wedges were cooked in water at 71° C. for 30 minutes and then were placed in 0.5% aqueous citric acid for 2 minutes. Next, the so-treated wedges were heated in air at 66° C. for 15 minutes and then vacuum sealed in plastic pouches. The plastic pouches were retorted as described in Example 3 at 116° C. for 15 minutes, cooled, and held at ambient temperature until used.

The so-prepared apple slices were finish-cooked in boiling water for 5 minutes. They exhibited good flavor and firm texture.

B. The procedure of part A was followed with the exception that the step of heating in air was omitted. The finish-cooked apple wedges were wet and mushy and had a bland flavor.

EXAMPLE 6

The procedure described in Example 5 was applied to carrots cut into 1 cm pieces. The finish-cooked product exhibited good flavor and a firm texture.

EXAMPLE 7

Twelve raw potatoes (Russet Burbank) were washed and peeled. The whole potatoes were then heated in water at 71° C. for 45 minutes and then heated in air at 66° C. for 15 minutes.

The moisture contents of the outer and inner sections of the above potatoes were determined according to the procedures described in U.S. Pat. No. 2,983,619. Accordingly, a layer of about 0.16 cm of tissue was removed from each of the above potatoes. The layers were weighed, dried at 25° C. for 18 hours, and re-weighed; the moisture content was then calculated. The potatoes were cut into half and a 0.6 cm plug was removed from the center thereof. The moisture content was determined as described above.

The outer surface tissue of the so-treated potatoes had a moisture content of 67.4% and the inner core tissue had a moisture content of 83.3%.

Another lot of twelve potatoes was treated similarly with the exception that the heating in air was for 10 minutes. The outer surface tissue had a moisture content of 72.3% and the inner core tissue, 82.8%.

In the process of U.S. Pat. No. 2,983,619 no part of the potato tissue can have greater than 68% moisture, otherwise the potato products were soft, watery, and mushy (col. 5, Example 3). The potatoes of applicants' method have a moisture content above 68%, typically about 70% at the surface and about 80% at the inner core. The instant product was boiled in water for 45 minutes before sloughing of the surface tissue was observed. The flavor of the boiled product was very good and the texture was firm.

EXAMPLE 8

Raw potatoes (Russet Burbank, about 20% solids content, 1.9 to 3.8 cm in diameter) were divided into three lots.

The potatoes of Lot A were cooked in steam at 75° C. for 45 minutes and heated in air at 77° C. for 5 minutes. A small portion of these potatoes were removed from the lot and then moisture content was determined (as described in Example 7) to be 70% at the outer surface and 78% at the core. The remainder of the potatoes was placed in #303 cans with water. The cans were sealed and then retorted at 121° C. and 15 psig for 25 minutes.

Lot B potatoes were cooked in steam at 75° C. for 45 minutes and then heated in air at 77° C. for 210 minutes to reduce the moisture content to 43% at the outer surface and 67% at the core (determined as in Example 7). The potatoes were placed in #303 cans and retorted as in Lot A.

The potatoes of Lot C were treated as those of Lot B with the following change. The potatoes were placed in cans with water containing 1% starch rather than water alone.

The results are summarized below.

| Lot | Medium | Cook Temp (°C.) | Cook Time (min) | Heat Temp (°C.) | Heat Time (min) | Moisture content Outer (%) | Moisture content Inner (%) | Texture after retorting |
|---|---|---|---|---|---|---|---|---|
| A | Steam | 75 | 45 | 77 | 5 | 70 | 78 | No sloughing, very firm |
| B[a] | Steam | 75 | 45 | 77 | 210 | 43 | 67 | Considerable sloughing, soft |
| C[a] | Steam | 75 | 45 | 77 | 210 | 43 | 67 | Sloughing, soft |

The above experiment demonstrates that our process differs from that of the U.S. Pat. No. 2,983,619. In our method non-sloughing potatoes are prepared with minimal heating-in-air time and in the absence of aqueous starch suspensions. The prior art process produced a totally unacceptable precooked potato, which exhibited considerable sloughing on subsequent retorting.

EXAMPLE 9

The procedures described in Example 8 for potatoes of Lot A and Lot B were repeated. After the potatoes were heated in air, they were boiled in water for 20 minutes instead of being retorted. The potatoes of Lot A had a firm, mealy texture and mashed readily whereas those of Lot B had a leather-like outer layer which made them very difficult to mash.

This example further illustrates the differences between our process (Lot A) and the U.S. Pat. No. 2,983,619 method (Lot B).

Having thus described our invention, we claim:

1. A process for preparing precooked fruits and vegetables, which exhibit excellent texture, flavor, and color on finish-cooking, comprising the steps of
   (a) washing raw, unpeeled fruits or vegetables,
   (b) cooking the fruits or vegetables to their centers without damage to the surface tissue thereof, the temperature of said cooking being below the temperature at which sloughing of the fruit or vegetable surface would occur if the fruit or vegetable were cooked to its center at that temperature, said sloughing occurring at a temperature of about 81°–83° C., for a period of about 5 to 45 minutes,
   (c) heating the so-cooked fruits or vegetables of step b in air at a temperature of about 66°–93° C. for a period of about 5 to 20 minutes such that the fruit or vegetable tissue has a moisture content above 68%, and then,
   (d) preserving the so-heated fruits or vegetables in the absence of starch suspensions.

2. The process of claim 1 wherein the fruits or vegetables are peeled prior to cooking them.

3. The process of claim 1 wherein the fruits or vegetables are frozen to preserve them.

4. The process of claim 1 wherein the fruits or vegetables are chilled to preserve them.

5. The process of claim 1 wherein the fruits or vegetables are retorted to preserve them.

6. The process of claim 1 wherein the vegetables are potatoes.

7. The process of claim 6 wherein the potatoes are chilled at a temperature of about 0.5° to 4.5° C. for a period of about 1.5 to 4 hours to preserve them.

8. The process of claim 7 wherein the so-chilled potatoes are cut into pieces.

9. The process of claim 8 wherein the potatoes are cut by shredding to give hash brown potatoes.

10. The process of claim 8 wherein the potatoes are cut by thin-slicing to give pan-frying potatoes.

11. The process of claim 1 wherein the vegetables are carrots.

12. The process of claim 1 wherein the fruits are apples.

* * * * *